No. 621,002. Patented Mar. 14, 1899.
F. W. WASCHAU.
REPEATING WATCH.
(Application filed June 18, 1898.)
(No Model.) 5 Sheets—Sheet 1.
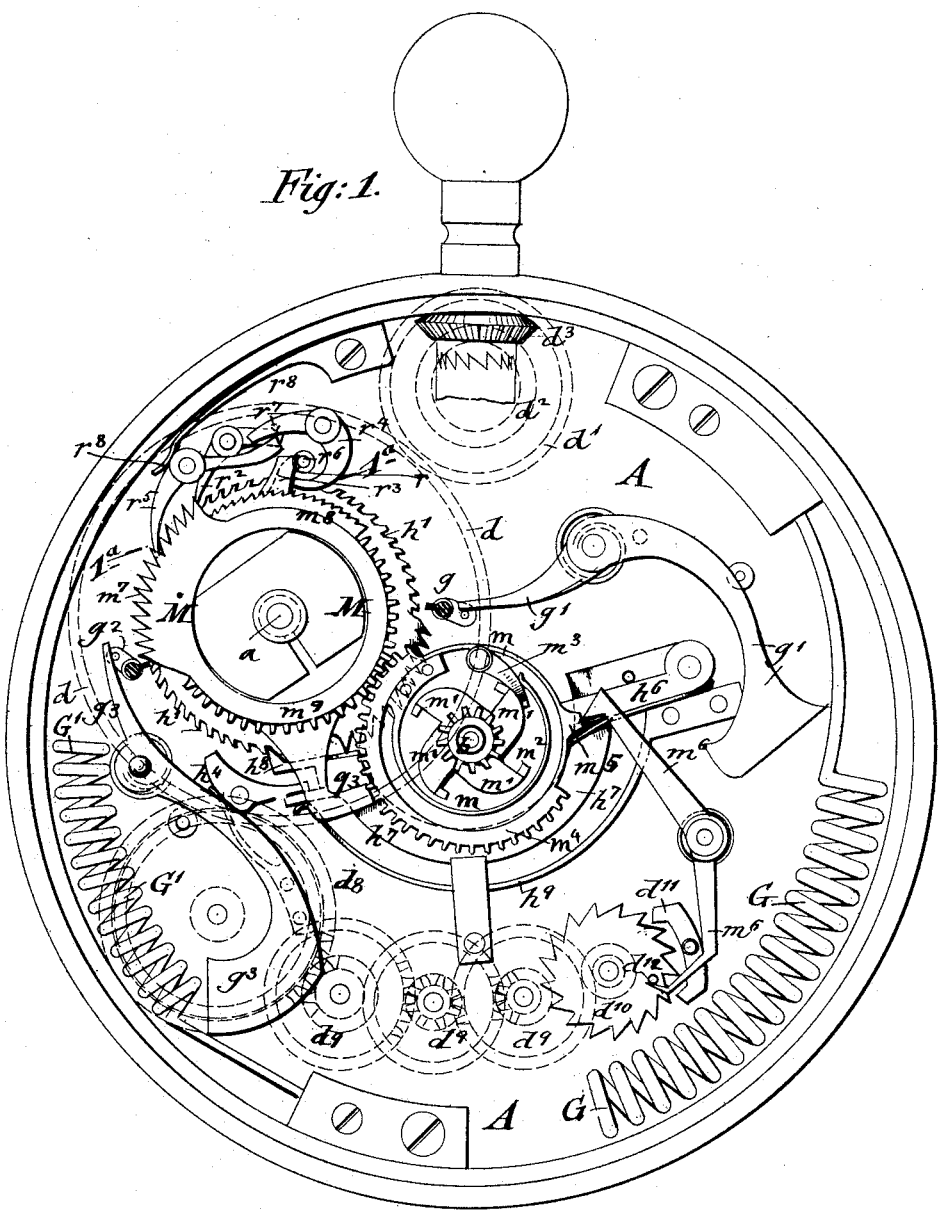
Fig. 1.
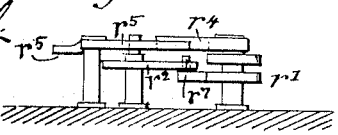
Fig. 1ª.
WITNESSES:
Geo. W. Jackel.
M. H. Hurtzel.
INVENTOR
Fredrick W. Waschau
BY
Gorneck Haegener
ATTORNEYS.

No. 621,002. Patented Mar. 14, 1899.
F. W. WASCHAU.
REPEATING WATCH.
(Application filed June 18, 1898.)
(No Model.) 5 Sheets—Sheet 2.
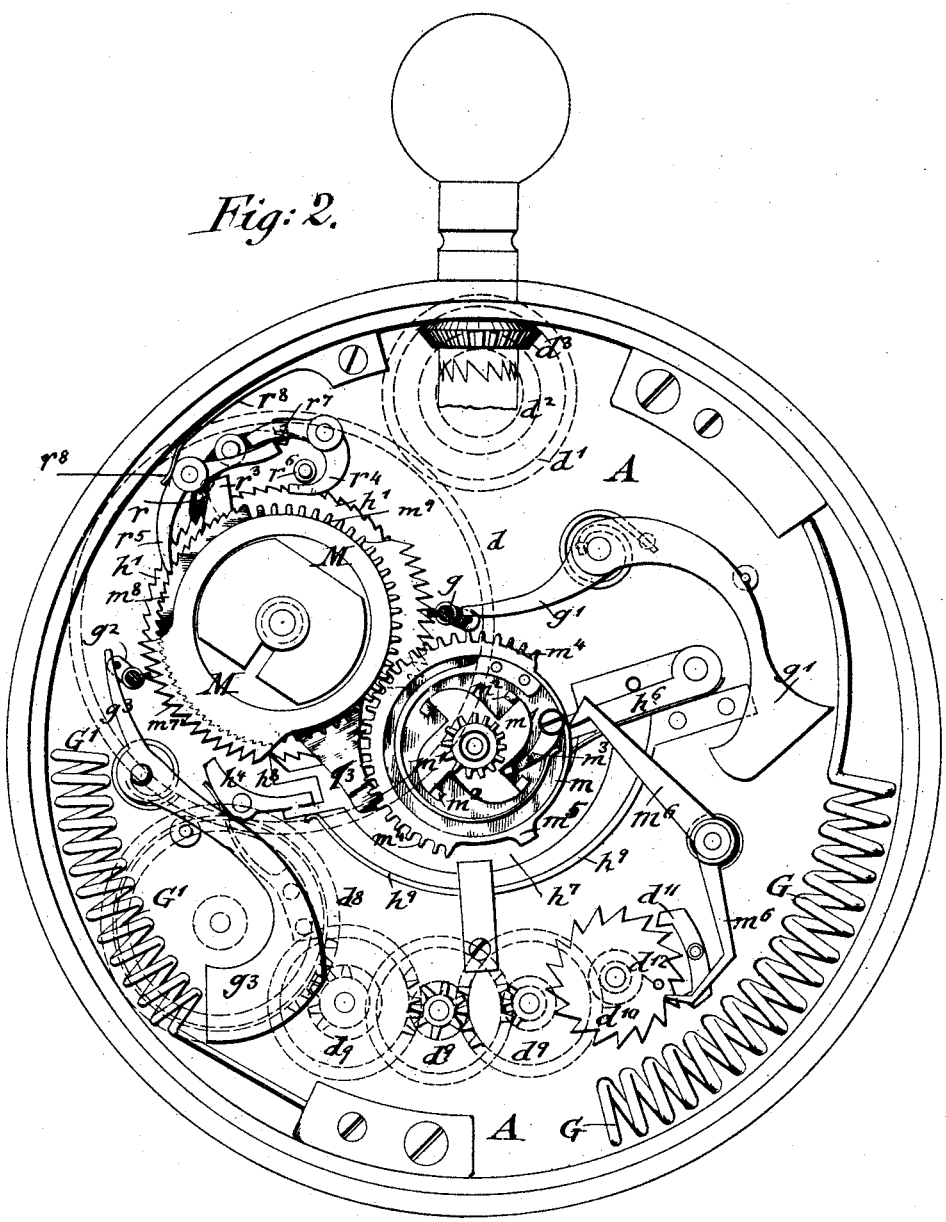
Fig: 2.
WITNESSES: INVENTOR
Fredrick W. Waschau
BY
ATTORNEYS.

No. 621,002. Patented Mar. 14, 1899.
F. W. WASCHAU.
REPEATING WATCH.
(Application filed June 18, 1898.)
(No Model.) 5 Sheets—Sheet 3.
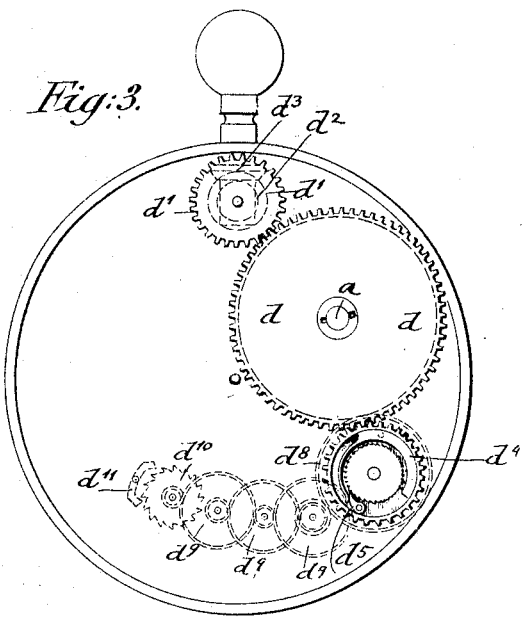
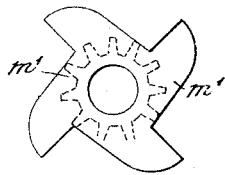
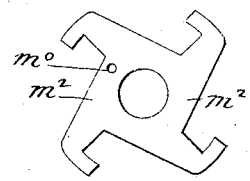
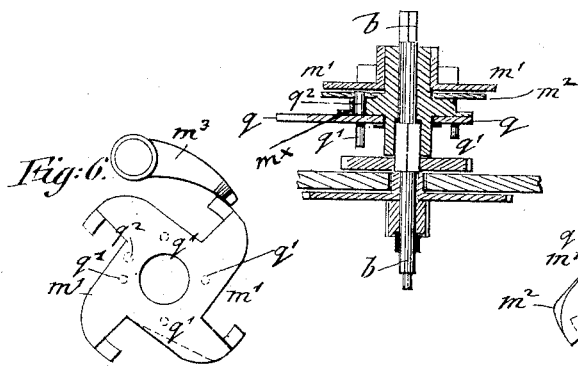
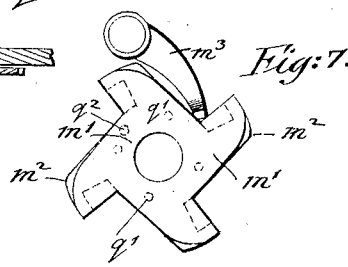
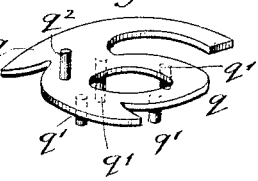
WITNESSES:
INVENTOR
Fredrick W. Waschau
BY
ATTORNEYS.

No. 621,002. Patented Mar. 14, 1899.
F. W. WASCHAU.
REPEATING WATCH.
(Application filed June 18, 1898.)
(No Model.) 5 Sheets—Sheet 4.
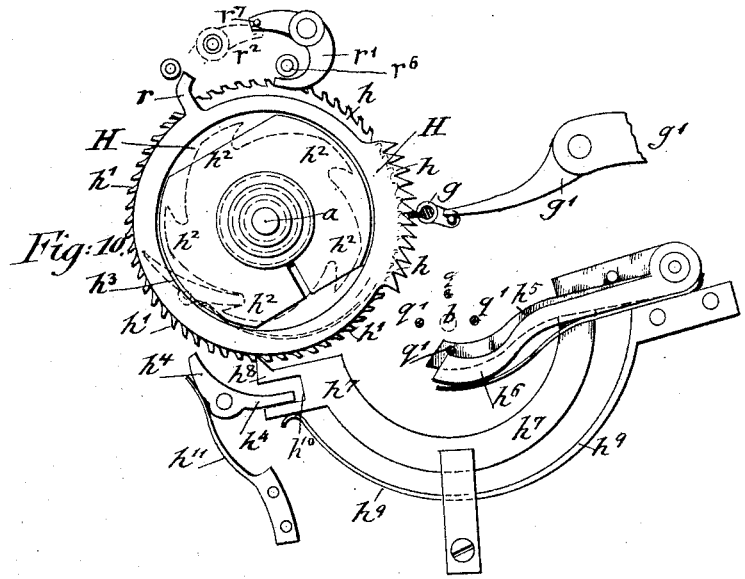
Fig: 10.
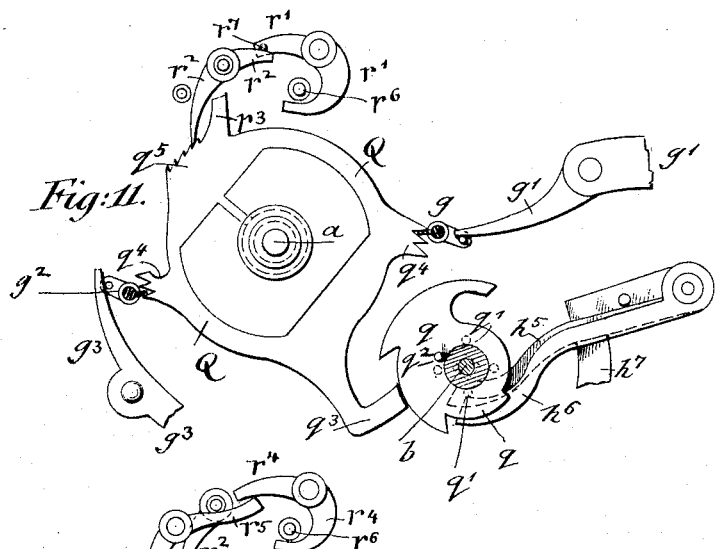
Fig: 11.
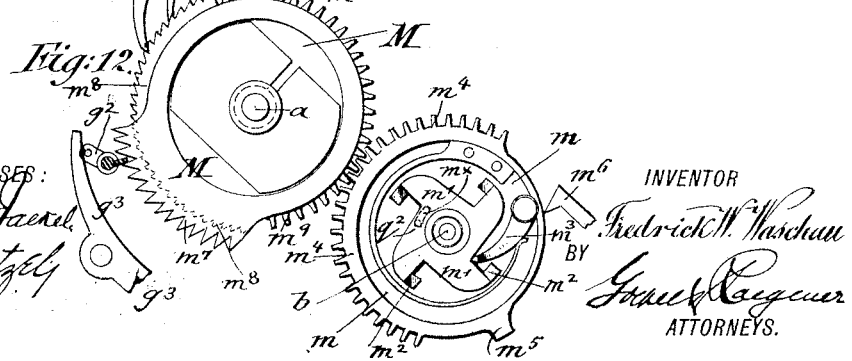
Fig: 12.
WITNESSES:
Geo. W. Jaekel
M. H. Huntzely
INVENTOR
Fredrick W. Waschau
BY
Gospel Cargener
ATTORNEYS.
THE NORRIS PETERS CO., PHOTO-LITHO., WASHINGTON, D. C.

No. 621,002. Patented Mar. 14, 1899.
F. W. WASCHAU.
REPEATING WATCH.
(Application filed June 18, 1898.)
(No Model.) 5 Sheets—Sheet 5.
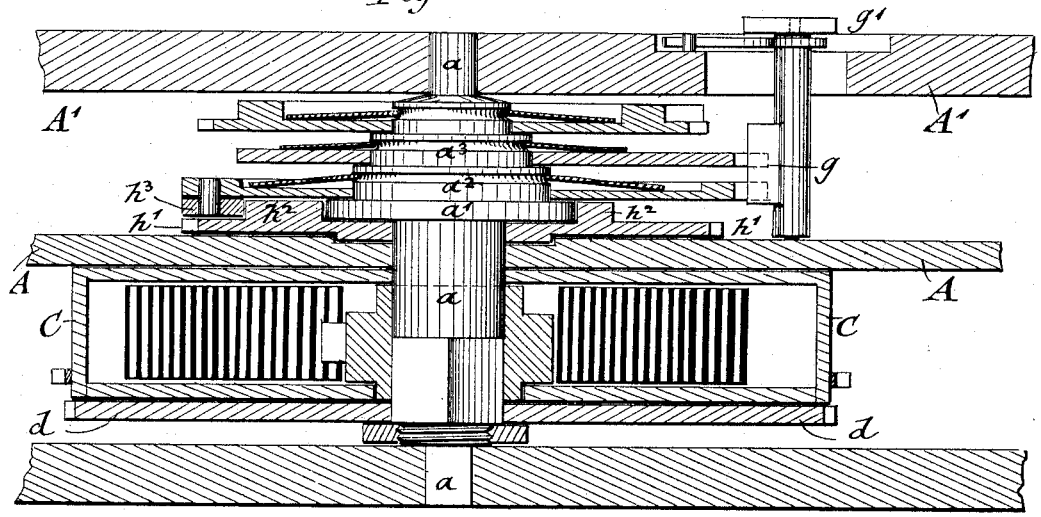
Fig. 13.
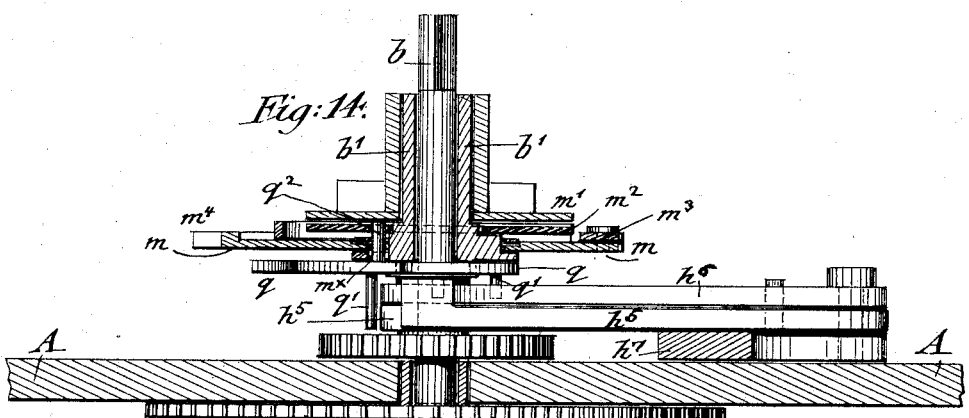
Fig. 14.
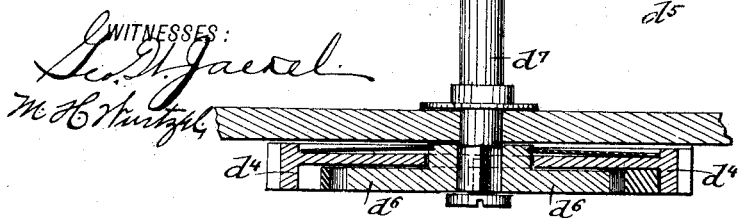
Fig. 15.
Fig. 16.
WITNESSES:
INVENTOR
Fredrick W. Waschau
BY
ATTORNEYS.
THE NORRIS PETERS CO., PHOTO-LITHO., WASHINGTON, D. C.

UNITED STATES PATENT OFFICE.

FREDRICK W. WASCHAU, OF MEDFORD, OREGON, ASSIGNOR OF ONE-FOURTH TO JOHN U. WILLEKE, OF SAME PLACE.

REPEATING WATCH.

SPECIFICATION forming part of Letters Patent No. 621,002, dated March 14, 1899.

Application filed June 18, 1898. Serial No. 683,781. (No model.)

*To all whom it may concern:*

Be it known that I, FREDRICK W. WASCHAU, a citizen of the German Empire, residing at Medford, in the county of Jackson and State of Oregon, have invented certain new and useful Improvements in Repeating Watches, of which the following is a specification.

Repeating watches were heretofore made in such a manner that a separate motor-spring was required for actuating the repeating mechanism by which the hour, quarter-hour, and minutes were sounded. The repeating mechanism by which this was accomplished was complicated, and consequently these watches were too expensive for general use.

My improved repeating watch is designed with the view of obviating the objectionable features of the repeating watches heretofore made and of complying with the following requirements: first, that it can be inserted into any standard American case; second, that the stem of the watch is not only used for winding up the mainspring and setting the hands, but also for starting the repeating mechanism; third, that the power for operating the repeating mechanism is supplied by the mainspring, so that a separate motor-spring for the repeating mechanism is not required; fourth, that the striking mechanisms and the moderating-gear are operated from the mainspring-arbor, while the going mechanism is operated from the mainspring-barrel; fifth, that the mainspring-barrel and its arbor can be removed for repairs without interfering with any part of the going and repeating mechanisms; sixth, that it will strike the hours, quarter-hours, and minutes without impairing the power of the mainspring and interfering with the regular going-train of the movement, and, seventh, that my improved repeating watch can be manufactured at a considerably smaller price than the repeating watches heretofore in use.

My invention consists of certain combinations of parts and details of construction, which will be fully described hereinafter and finally pointed out in the claims.

In the accompanying drawings, Figure 1 represents a bottom view of my improved repeating watch, showing the striking mechanisms in their normal position of rest, the dial and auxiliary plate being removed. Fig. 1$^a$ is a detail vertical transverse section on line 1$^a$ 1$^a$, Fig. 1, showing the releasing mechanisms for the quarter-hour and minute striking racks. Fig. 2 is also a bottom view of my improved repeating watch, showing the striking mechanisms in position ready for striking, the dial and auxiliary plate of the movement being likewise removed. Fig. 3 is a top view of the movement, showing the winding-gear and its connection with the moderating-gear. Figs. 4 and 5 are respectively detail top views of the upper and lower plates of the minute-snail or snail device. Figs. 6 and 7 are also top views of the upper and lower plates of the minute-snail, showing them placed in position one on top of the other and respectively before and after the lower plate has been shifted so as to permit the dropping of the click of the minute-snail. Fig. 8 is a perspective view of the step-shaped quarter-hour snail or snail device. Fig. 9 is a detail vertical section showing the connection of the step-shaped cam or snail with the center arbor and with the upper and lower plates of the minute-snail. Figs. 10, 11, and 12 are detail plan views, respectively, of the hour-striking mechanism and its snail or snail device, of the quarter-hour striking mechanism and its snail, and of the minute-striking mechanism and its snail, the quarter-hour and minute striking racks being shown in connection with their releasing mechanisms. Fig. 13 is a detail vertical transverse section through the mainspring-barrel and the different striking-racks located on the arbor of the same, said figure being drawn on a larger scale. Fig. 14 is a detail vertical transverse section through the center arbor and the snail S on the same, also drawn on a larger scale; and Figs. 15 and 16 are respectively a top view of the ratchet-wheel and click for locking the mainspring-arbor and a vertical central section showing the connection of the arbor of the ratchet-wheel with the moderating-gear.

Similar letters of reference indicate corresponding parts.

In my improved repeating watch the hour, quarter-hour, and minute striking mechanisms by which the striking of the full hour, quarter-hours, and minutes is produced are located on the bottom of the movement, between the main plate A and an auxiliary plate A', which is required for supporting the different arbors of my improved repeating mechanisms and which is located below the dial of the movement. The striking mechanisms are operated from the mainspring-arbor in connection with hour, quarter-hour, and minute snails, which are located on the center arbor of the movement and operated by the going mechanism of the same. The striking mechanisms are started by the turning of the stem and set to their respective indexes, so as to strike the required hour, quarter-hour, and minutes whenever the repeating mechanism of the watch is called into action by the partial winding of the mainspring. The going mechanism of the watch is operated in the usual manner by the mainspring-barrel under the influence of the mainspring, while the moderating-gear is operated from the mainspring-arbor in connection with a pawl-and-ratchet mechanism and intermediate gear-wheels. When it is desired to inspect or repair the striking mechanisms and their snails, the hands, dial, and the auxiliary plate are removed, so that all the parts are fully within view, as shown in Figs. 1 and 2.

*The hour snail device.*—The hour-snail is driven by a gear-wheel $h'$, the circumference of which is divided into sixty teeth. This gear-wheel is applied loosely to the mainspring-arbor $a$ and guided by its hub in a recess of the plate A, so as to turn loosely on said arbor, as shown in Fig. 13. On the upper part of this gear-wheel are formed five ratchet-teeth $h^2$, which are shown in dotted lines in Fig. 10, said ratchet-teeth being successively engaged by a spring-actuated click $h^3$, that is pivoted to the hour-striking rack near its circumference and that drops into the next adjacent recess between said teeth when the main gear-wheel $h'$ has been moved for the distance of twelve teeth. The main gear-wheel $h'$ is permitted to turn at every full hour for the distance of one tooth by a pawl $h^4$, which is actuated every hour by an intermediate lever mechanism from the longer one of four pins on a step-shaped cam or snail $q$ of the quarter-hour index. This snail $q$ is located on the center arbor $b$ and provided with four pins $q'$—three shorter pins and one longer pin, as shown in Figs. 8 and 14. The snail $q$ makes one full rotation with the center arbor for every hour. Sidewise of the pins of the snail $q$ are arranged two pivoted and spring-actuated levers $h^5$ $h^6$, one below the other, the upper lever being actuated by the three shorter pins, while both the upper and lower levers are actuated by the longer pin of the snail. To the lower lever is applied a curved lever-arm $h^7$, which carries a check-pawl $h^8$ at its outer extremity, said check-pawl engaging the teeth of the main gear-wheel of the hour-snail, as shown in Fig. 10. The check-pawl $h^8$ of the curved lever-arm $h^7$ is held in engagement with the teeth of the main-gear wheel by a spring $h^9$, which presses on said lever-arm. The lever-arm is provided near the check-pawl with a recessed portion $h^{10}$, which engages one end of the fulcrumed pawl $h^4$, that is pressed by the tension of its spring $h^{11}$ against one side of said recessed portion, so as to normally clear the teeth of the main gear-wheel, while the oscillating motion of the lever-arm $h^7$ produces the oscillation of the pawl and the engagement of its opposite end with one of the teeth of the main gear-wheel, so as to permit the movement of the latter forward for the distance of one tooth. As soon as the longer pin $q'$ passes by the lower lever $h^5$ the lever-arm $h^7$ and the push-pawl $h^4$ are returned into their normal positions by their springs $h^9$ and $h^{11}$, and the check-pawl $h^8$ reëngages the main gear-wheel, as shown clearly in Figs. 1, 2, and 10. The forward motion of the main gear-wheel $h'$ for the distance of one tooth is thus accomplished at every full hour by the action of the snail, lower lever, curved lever-arm, and oscillating pawl described. When the main gear-wheel has been moved for the distance of twelve teeth, the click $h^3$ clears one of the ratchet-teeth on the main gear-wheel $h'$ and drops onto the next ratchet-tooth on the same. By the twelve step-by-step motions of the main gear-wheel one of the ratchet-teeth on the same is moved past the click on the hour-striking rack H every twelve hours, the size of each ratchet-tooth corresponding with twelve circumferential teeth, or one-fifth of the circumference of the main gear-wheel. The hour-striking rack extends over the main gear-wheel of the repeating mechanism and is held on a shoulder of the mainspring-arbor by the friction of a spring-plate, so as to turn with said arbor. The five ratchet-teeth $h^2$ on the main gear-wheel form, in connection with the click $h^3$ on the hour-striking wheel, the snail device for the hour-striking mechanism.

*The quarter-hour snail device.*—The quarter-hour snail $q$ is frictionally applied to a sleeve $b'$, keyed to a square portion of the center arbor $b$, as shown in Figs. 9 and 14. Besides the four pins $q'$ for operating the lever-arm $h^7$ the snail $q$ carries at its other side a single pin $q^2$, as shown clearly in Figs. 8 and 9. Four steps are arranged at the circumference of the snail, which are approximately equal in size and correspond each to a quarter of an hour, so as to present successively one portion or step at every successive quarter of an hour to contact with a heel $q^3$ of the quarter-hour-striking rack Q, (shown in Fig. 11,) so that it will strike, respectively, one, two, or three strokes, according to the quarter-hour step which is at the time presented to said heel. The function of the four pins $q'$ on the snail $q$ was referred to in connection with the actuating mechanism for the main gear-wheel and will be further described in connection with the minute-snail, as they exert no action on the quarter-hour snail.

*The minute snail device.*—The minute-snail is located, like the quarter-hour snail, on the sleeve $b'$ of the center arbor $b$ and composed of a disk $m$, placed loosely on said sleeve, two plates $m'$ $m^2$ on said disk, one below the other, and a spring-actuated click $m^3$, that is pivoted to the disk $m$, as shown in Figs. 12 and 14. The disk $m$ is provided at the greater portion of its circumference with teeth $m^4$, which mesh with corresponding teeth at the circumference of the minute-striking rack M. The subdivision of the teeth at the circumference of the disk and minute-striking rack is based on a total number of sixty teeth for the entire circumference, so as to correspond with the number of teeth of the main gear-wheel of the hour-snail. On the circumference of the plate-carrying disk $m$ is further arranged a projection or heel $m^5$, which operates a fulcrumed and spring-actuated stop-lever $m^6$, by which and the heel the moderating-gear of the repeating mechanism is either released or arrested, as will be fully described later on in connection with the action of the moderating-gear. The upper and lower plates $m'$ $m^2$ are each provided with four segmental arms, the upper plate $m'$ being fixed on the sleeve of the center arbor, while the lower plate $m^2$ is capable of a slight shifting motion. The segmental arms of the lower plate $m^2$ correspond to the arms of the upper plate, but with the difference that the arms of the lower plate extend at their extremities slightly beyond the arms of the upper plate. The lower plate $m^2$ is engaged by the single pin $q^2$ of the snail $q$, before referred to, said pin passing through a slot $m^\times$ in the collar for the plate-carrying disk $m$ and engaging an aperture $m^0$ in the lower shifting plate of the minute-snail, as shown clearly in Figs. 5, 9, 12, and 14. By this connection with the pin $q^2$ on the snail $q$ the lower plate $m^2$ of the minute-snail is shifted every fifteen minutes by the action of the beveled end of the upper spring-actuated lever $h^6$ on one of the four pins $q'$ at the opposite side of the snail $q$. When either one of the four pins of the snail arrives at the beveled end of said lever, this lever is returned to its normal position by the tension of its spring, so that its beveled end imparts a short shifting motion to the snail and by the connecting-pin on the same to the lower plate of the minute-snail. This plate is thereby shifted so that the projecting ends of its segmental arms are placed below the arms of the upper plate of the minute-snail, so that the spring-actuated click $m^3$, that has moved over the segmental arms, is permitted to drop from the ends of the arms into the next recess between the same, as shown, respectively, in Figs. 6 and 7. The click $m^3$ is then in proper position so that the edges of the next segmental arms can move past the same. As soon as the dropping of the click is accomplished, which takes place every full quarter of an hour, the actuating-lever $h^6$ is returned to its normal position until the next pin on the snail, moving along the inner edge of the actuating-lever $h^6$, will cause the slow return motion of the snail and lower plate into their former position, so that the ends of the segmental arms of the lower plate project again beyond the segmental arms of the upper plate, as shown in Figs. 6 and 12. The pin $q'$ presses gradually the spring-actuated lever $h^6$ back until it arrives again at the beveled end of the same and is then acted upon by the tension of its spring, so as to produce again the quick shifting of the snail for the distance of the short slot in the collar of the plate-carrying disk of the minute-snail, and thereby the shifting of the lower plate $m^2$ by the pin $q^2$, so that the ends of its segmental arms are returned below the arms of the upper plate for permitting the spring-actuated click $m^3$ to drop into the next recess between the segmental arms of the upper and lower plates of the minute-snail, as before described. At the end of every hour the longer pin $q'$ on the snail engages both the upper and lower actuating-levers, so that the shifting of the snail and lower plate takes place simultaneously with the action of the pawl $h^4$ on the main gear-wheel, by which the latter is permitted to move for the distance of one tooth. The pins on the snail, the upper and lower plates, with their segmental arms, and the spring-actuated click, along which said arms are moved, form the minute snail device for the minute-striking mechanism.

*The striking mechanisms.*—The striking mechanisms are operated whenever repetition action is desired by simply turning the stem of the watch once or twice in the same manner as when winding up the mainspring. By the turning of the stem sufficient power is imparted to the mainspring to actuate the striking mechanisms without loss of driving power, the mainspring acting thus as the motor-spring for the repeating and going mechanisms. While the going mechanism of the watch is operated by the gear-wheel on the mainspring-barrel in the usual manner, the striking mechanisms are operated by the turning of the arbor of the mainspring-barrel under the influence of the mainspring. For this purpose the mainspring-arbor $a$ is provided with a number of step-shaped shoulders $a'$ $a^2$ $a^3$, which carry, respectively, the hour, the quarter-hour, and the minute striking racks, as shown in Fig. 13. Each striking-rack is held in position on its shoulder on the arbor by the friction of its spring-plate and is thereby caused to move with the arbor.

*The hour-striking mechanism.*—The hour-striking mechanism is shown clearly in detail in Fig. 10 and consists of an hour-striking rack H, which is provided at a portion of its circumference with twelve striking-teeth $h$, which correspond in size with a corresponding number of teeth on the main gear-wheel, or one-fifth part of its circumference, the remaining four-fifths of the circumference being smooth. At a suitable point on the circumference of the hour-striking rack H is arranged a curved lug $r$, which serves for actuating the releasing mechanism $r'$ $r^2$ of the quarter-hour-striking wheel Q as soon as the hour-striking rack H has completed its motion. The striking-teeth $h$ of the hour-striking rack H engage during the return motion of said rack one after the other a pivoted bell-crank click $g$, which engages the inner end of the fulcrumed and spring-actuated hammer $g'$ of the hour-gong G, so as to produce the striking of the same.

*The quarter-hour-striking mechanism.—* The quarter-hour-striking rack Q is provided approximately at diametrically opposite points of its circumference with a set of three teeth $q^4$ each. One set of teeth engages with the bell-crank click of the hour-striking hammer $g'$, while the other set of teeth engages the bell-crank click $g^2$ of the minute-striking hammer $g^3$, as shown in Fig. 11. The quarter-hour-striking rack Q is further provided at its circumference with ratchet-teeth $q^5$, which are engaged by the spring-actuated pawl $r^2$ of the releasing mechanism of the quarter-hour-striking rack and released at the proper time by the lug $r$ on the circumference of the hour-striking rack H. Adjacent to the ratchet-teeth $q^5$ on the circumference of the quarter-hour-striking rack is arranged a lug $r^3$, by which the releasing mechanism $r^4$ $r^5$ of the minute-striking rack M is actuated. Diametrically thereto is arranged on the quarter-hour-striking rack Q the angular heel $q^3$, before described, by which the contact with the step-shaped circumference of the quarter-hour snail is made.

*The minute-striking mechanism.—* The minute-striking mechanism is formed of a rack M, which is shown in Fig. 12, and provided at one portion of its circumference with fourteen teeth $m^7$, that serve for operating the bell-crank click $g^2$, by which the minute-hammer $g^3$ is operated in the customary manner in repeating watches. On the circumference of the minute-striking rack M and partly below and partly beyond the hammer-operating teeth are arranged a number of ratchet-teeth $m^8$, which are engaged by the spring-actuated pawl $r^5$ of the releasing mechanism of the minute-striking rack M until said pawl is withdrawn by the action of the lug $r^3$ on the lever $r^4$. The remaining circumference of the minute-striking rack M is provided with ordinary teeth $m^9$, that intermesh with the teeth $m^4$, arranged on the greater portion of the circumference of the plate-carrying disk $m$, to which disk the spring-actuated click $m^3$ of the minute-snail is pivoted.

*The releasing mechanism of the hour, quarter-hour, and minute striking mechanisms.—* The releasing mechanism of the hour, quarter, and minute striking racks is shown in Figs. 1, 1ᵃ, 10, 11, and 12 and is composed of a stop-pin $r^6$, applied to the main plate A, the two fulcrumed releasing-levers $r'$ $r^4$, pivoted one over the other upon a single pin, the lower being provided with a pin $r^7$ at one arm, and two spring-actuated and independently-fulcrumed pawls $r^2$ $r^5$, that are provided with arms which are engaged, respectively, by the pin $r^7$ of the lower releasing-lever $r'$ and an arm of the upper lever $r^4$. When the lug $r$ on the hour-striking rack arrives at the stop-pin $r^6$, it strikes the curved arm of the lower releasing-lever $r'$ and moves the same back sufficiently, so that the pawl $r^2$ of the quarter-hour-striking rack Q is released and the latter permitted to make the required motion for sounding the quarter-hour strokes. When the lug $r^3$ on the quarter-hour-striking rack Q arrives at the stop-pin $r^6$, it pushes the upper releasing-lever $r^4$ back, so that the latter releases the spring-actuated pawl $r^5$ of the minute-striking rack from the ratchet-teeth on the same, so as to permit thereby the minute-striking rack to complete the motion required for operating the minute-striking devices. The releasing-levers are returned to their normal positions by the tension of a spring $r^8$, which actuates the releasing-pawl $r^5$ of the minute-striking wheel. The hour and minute hammers $g'$ $g^3$ and gongs G G' operate in the usual manner by their clicks $g$ $g^2$, the hammers being fulcrumed to the main plate A and acted upon by suitable spiral springs whenever their shorter arms are actuated by the bell-crank clicks. The heads of the hammers $g'$ $g^3$ strike the shanks of the gongs G G', which shanks are attached to sockets on the rim of the main plate, said gongs being preferably formed of helically-bent wires, the hour-gong G being formed of a larger coil, while the minute-gong G' is composed of a smaller coil, so as to produce a deeper sound for the full hours and a lighter sound for the minutes. The quarter-hours are indicated by a double stroke formed by one stroke of the minute-gong and a quickly-following stroke of the hour-gong.

*The moderating-gear.—* The moderating-gear is operated from the arbor $a$ of the main-spring-barrel C, said arbor carrying on its square end the usual gear-wheel $d$, as shown in Figs. 3 and 13. The gear-wheel meshes with a motion-transmitting gear-wheel $d'$ on the shaft of one of the bevel gear-wheels $d^2$ $d^3$, which are operated by the stem of the watch when the mainspring is wound up. The gear-wheel $d$ on the mainspring-arbor is also in mesh with a gear-wheel $d^4$, by which the moderating-gear is operated at the proper time, said gear-wheel carrying a spring-actuated check-pawl $d^5$, which engages a ratchet-wheel $d^6$ on the arbor of the first wheel $d^8$ of the moderating-gear, said pawl and ratchet-wheel arresting the motion of the mainspring-arbor when the arbor is not rotated by the winding-up mechanism. The ratchet-wheel $d^6$ has minute-teeth, which are engaged by the check-pawl $d^5$, as shown in Figs. 3 and 15. The ratchet-wheel has preferably sixty teeth, so that the immediate arresting of the mainspring-arbor without any danger of skipping is accomplished. The ratchet-wheel $d^6$ is keyed to the square end of the arbor $d^7$, which passes through the main plate A of the movement and carries at its opposite end the first gear-wheel $d^8$ of the moderating-gear, which meshes with a pinion on the arbor of the second wheel of the moderating-gear. The moderating-gear may consist of a suitable train of intermeshing gear-wheels $d^9$, which finally transmit the motion to an escapement-wheel $d^{10}$, that is operated in connection with an oscillating escapement $d^{11}$, as shown clearly in Figs. 1, 2, and 3. The escapement-wheel $d^{10}$ carries a stop-pin $d^{12}$, that is engaged by the fulcrumed and spring-actuated stop-lever $m^6$, which serves to arrest the motion of the moderating-gear when the action of the striking mechanisms has been accomplished. For this purpose the projecting heel $m^5$ on the circumference of the minute-snail-carrying disk $m$ actuates the stop-lever immediately after the striking of the minutes and moves the opposite end of the same into engagement with the stop-pin $d^{12}$, so as to arrest the motion of the moderating-gear.

*The hand-setting mechanism.*—The setting of the hands is accomplished from the stem by any approved hand-setting mechanism. The hour, quarter-hour, and minute snails are set at the same time, as they are located on the sleeve keyed to the center arbor, so as to correspond with the position of the hands on the dial and produce thereby the corresponding operations of the striking mechanisms at the proper time whenever the repeating action is desired. The setting of the hands and of the snails, however, takes place without affecting the going mechanism of the movement, with which they are frictionally connected in the well-known manner.

Operation: My improved repeating watch is operated by simply turning once or twice the stem in the same direction as when winding up the watch. The object of the turning of the stem is, besides winding up the spring-barrel sufficiently for producing the power for operating the striking mechanisms, to release and start the different striking mechanisms and the moderating-gear and produce the functioning of the same. When the watch is wound up in the regular manner and the mainspring is thereby wound up to its full extent, the striking mechanisms are automatically actuated directly after the winding is completed, and thereby the mainspring unwound sufficiently, so that whenever the turning of the stem is repeated the repeating action of the striking mechanisms will take place. In other words, the repeating mechanisms can be operated as often as desired without impairing the power of the mainspring, for the reason that by the turning of the stem the power lost by the mainspring during the former repeating action is always restored again. This is the essential feature of novelty of my new repeating watch and can only be accomplished by taking the power for operating the striking mechanisms from the arbor of the mainspring, while the going mechanism is kept in motion by the mainspring from the mainspring-barrel. As soon as the stem is turned once or twice the moderating-gear is released, for the reason that the projecting heel on the carrying-disk of the minute-snail is moved out of contact with the stop-lever and the latter placed into the position shown in Fig. 2, so as to clear the stop-pin on the escapement-wheel of the moderating-gear. Thus the repeating mechanism is released for action. By the turning of the arbor of the mainspring under the influence of the stem all the parts of the striking mechanisms located on said arbor also are turned until they arrive at their respective snails, which latter are moved by the going mechanism of the watch. The hour, quarter, and minute striking racks are turned with the arbor of the mainspring, while the minute-snail-carrying disk is turned by the minute-striking rack, and thereby the moderating-gear liberated, as described. The turning of the mainspring-arbor turns the hour-striking rack until its pawl $h^3$ arrives at the extreme end of the recess of its ratchet-tooth, as shown in dotted lines in Fig. 10. The quarter-hour-striking rack turns likewise with the mainspring-arbor until its heel forms contact with the step of its minute-snail then facing it, as shown in Fig. 11. The minute-striking rack turns likewise with the mainspring-arbor and turns the minute-snail-carrying disk until the click on the same abuts against the next arms of the plates carried by said disk, as shown in Fig. 12. The turning of the minute-snail-carrying disk also releases the moderating-gear. By the turning of the hour and quarter-hour striking racks with the mainspring-arbor the releasing-pawls of the quarter-hour and minute striking racks are liberated and moved into engagement with the ratchet-teeth on said striking-racks, so as to hold them in the position to which they were set on their respective snails until they are withdrawn in successive order by the releasing-levers actuated by the lugs on the hour and quarter-hour striking racks. If the quarter-hour and minute striking racks were not held by the pawls, the regular succession in the striking of the hour, quarter-hour, and minutes would not be secured. As soon as the hour, quarter-hour, and minute striking racks are set against the respective snails the further turning of the mainspring-arbor exerts no influence on the same, as it continues to turn under the influence of the winding-up motion of the stem and overcomes the frictional connection of the striking-racks with their shoulders. As soon as the stem is released, however, the mainspring-arbor is turned under the influence of the mainspring in opposite direction, so as to carry the hour-striking rack alone, which thereby sounds the hour-gong by its striking teeth, click, and hammer, according to the number of striking-teeth that were permitted by the hour-snail to pass beyond the hammer-operating click. In Fig. 10 six teeth are shown as having passed beyond the click. Consequently the hour-gong will be struck six times. The lug of the hour-striking rack on abutting against the lower releasing-lever causes the withdrawal of the pawl of the quarter-hour-striking mechanism, so as to permit the striking action of the quarter-hours. In Fig. 11 only one striking-tooth has passed beyond the clicks of the hour and minute hammers. Consequently one stroke of each is produced, and thereby the first quarter past six o'clock indicated. The lug of the quarter-hour-striking rack on abutting against the upper releasing-lever causes the withdrawal of the pawl of the minute-striking rack, so that this is permitted to follow the motion of the mainspring-arbor. As eleven teeth have passed beyond the click of the minute-hammer, as shown in Fig. 12, eleven strokes are sounded, indicating that when the parts are in the position shown in Figs. 2, 10, 11, and 12 it is twenty-six minutes past six o'clock. While the successive striking of the hour, quarter-hour, and minutes takes place, the moderating-gear is in continuous motion and secures the even action of the striking mechanisms at proper intervals in the manner well known in repeating watches. As soon as the last minute-stroke has been sounded the heel on the minute-snail-carrying disk engages one end of the stop-lever and moves the opposite end of the same in contact with the stop-pin on the escapement-wheel, so as to interrupt the further motion of the moderating-gear and arrest the motion of the mainspring-arbor.

As often as the stem is turned the repeating action is produced, for the reason that the repeating mechanism forms an integral part of the watch and not an attachment which is called into action by a separate motor-spring. The repeating mechanism is therefore sounded after every full winding up of the watch and may thereafter be actuated as often as desired, the turning of the stem producing a compensatory winding up of the mainspring, so that it loses nothing of its power even by the most frequent actuations of the repeating mechanism. It is obvious, however, that when the stem is insufficiently turned the heel $m^5$ is moved only a short distance after releasing the stop-lever $m^6$ and the repeating action is continued only until the heel again throws the stop-lever into engagement with the moderating-gear. As by the insufficient winding the striking-racks are not turned until they are arrested by the snail devices, the result of an insufficient turning of the winding-stem is a repeating action, but only until the parts, including the mainspring, again arrive at their initial position, and therefore the correct time is not fully struck by the repeating mechanism. It will thus be seen that although an excess of winding simply has the effect to impart to the mainspring power in excess of that required for full and correct repeating action the extent of the repeating action is always limited, so that in no case can it exceed the extent of the power imparted to the spring by the winding. It cannot in any event draw upon that power of the mainspring which is reserved for the regular time-movement of the watch. Two or three turns of the stem are sufficient to accomplish the necessary winding, which is thus compensatory of the power consumed in the repeating action. The turns given may also include more or less in excess of the required power, which excess then remains in the mainspring at the end of the repeating action to actuate the regular time movement of the watch. It is thus apparent that the stem of the watch has two functions, namely:

First, to impart power to the mainspring for actuating the repeating mechanism. This power is that imparted by the first turns of the stem and is always immediately after winding first taken from the spring and may be termed the "extra" power, as it is distinct from the time-movement or reserve power and is always taken after the winding, without regard to the condition of the mainspring as to reserve power.

Second, the stem also serves after imparting the extra power to impart to the spring the power for running the time-movement. The extra power varies in quantity according to the variation in the duration of the repeating action necessary to indicate the correct time.

Having thus described my invention, I claim as new and desire to secure by Letters Patent—

1. In a repeating watch, the combination, with the mainspring and repeating mechanism actuated thereby, of means for imparting to said mainspring extra power for actuating the repeating mechanism, and means for arresting the action of the repeating mechanism when the extra power is exhausted, substantially as set forth.

2. In a repeating watch, the combination, with the mainspring, and means for imparting to said mainspring power for actuating the repeating mechanism, of striking devices actuated by the mainspring, a moderating-gear for said striking devices, a stop-lever, and means for throwing said stop-lever into engagement with the moderating-gear when the power so imparted is exhausted, substantially as set forth.

3. In a repeating watch, the combination of striking devices, a moderating-gear for the same, a stop-lever, and means for throwing the stop-lever into engagement with the moderating-gear so as to close the repeating action, substantially as set forth.

4. In a repeating watch, the hour snail device, driven by the going mechanism of the watch and consisting of an intermittently-moving gear-wheel, ratchet-teeth on the face of said gear-wheel, and a spring-actuated click on the hour-striking rack engaging with said ratchet-teeth, substantially as set forth.

5. In a repeating watch, the hour snail device, consisting of an intermittently-moving gear-wheel, a lever-operated pawl and check-pawl for the same actuated at every full hour for permitting the turning of said gear-wheel for the distance of one tooth, ratchet-teeth on said gear-wheel, and a spring-actuated click on the hour-striking rack engaging with said ratchet-teeth, substantially as set forth.

6. In a repeating watch, the quarter-hour snail device, located on the center arbor and consisting of a step-shaped cam or snail, four quarter-hour pins on one side and a shifting-pin on the other side, substantially as set forth.

7. In a repeating watch, the quarter-hour snail device consisting of a step-shaped pawl or cam having four pins on one side, three shorter and one longer one, and a single shifting-pin on the other side, substantially as set forth.

8. In a repeating watch, a minute snail device, consisting of a carrying-disk, a spring-actuated click pivoted to said disk, two overlapping plates on said disk having segmental arms, the arms of the lower plate projecting beyond the arms of the upper plate, and means for shifting the lower plate so as to bring the projecting ends of its segmental arms below the segmental arms of the upper plate for permitting the dropping of the click into the next recess between said arms, substantially as set forth.

9. In a repeating watch, the combination of the minute snail device, consisting of a carrying-disk, a spring-actuated click on said carrying-disk, two overlapping plates on said disk having segmental arms, the segmental arms of the lower plate being provided with ends projecting beyond the arms of the upper plate, a quarter-hour snail device below said disk, and a shifting-pin on said quarter-hour snail device engaging a hole in the lower plate so as to produce the shifting of the lower plate for permitting the dropping of the click into the next recess between the segmental arms of the plates, substantially as set forth.

10. In a repeating watch, the combination of a quarter-hour-striking rack applied frictionally to the mainspring-arbor and provided with two sets of three teeth each arranged approximately at diametrically opposite points, bell-crank clicks operated by said striking-teeth, fulcrumed and spring-actuated hammers operated by said clicks, and an hour and minute gong, substantially as set forth.

11. In a repeating watch, the combination of a quarter-hour-striking rack located frictionally on the mainspring-arbor, an angular heel on said quarter-hour-striking rack, a quarter-hour snail located on the center arbor, and hour and minute striking devices operated by two sets of teeth located at nearly diametrically opposite points on the quarter-hour-striking rack, substantially as set forth.

12. In a repeating watch, the combination, with the minute-striking rack located on the mainspring-arbor, of ratchet-teeth on the circumference of the minute-striking rack, a spring-actuated pawl for engaging said ratchet-teeth, a releasing-lever for said pawl, and a lug on the quarter hour-striking rack adapted to engage said releasing-lever and withdraw the pawl from the ratchet-teeth at the proper time for producing the striking of the minutes, substantially as set forth.

13. In a repeating watch, the combination of the minute-striking rack located frictionally on the mainspring-arbor and its striking devices, said minute-striking rack being provided with teeth at a portion of its circumference, a minute snail device located on the center arbor and composed of a carrying-disk provided with teeth at a portion of its circumference intermeshing with the teeth of the minute-striking rack, a spring-actuated click on said disk, and two plates having segmental arms, said click being moved along the face of said arms when the minute-striking rack is set into position for striking, substantially as set forth.

14. In a repeating watch, the combination, with the hour, quarter-hour and minute striking racks, located frictionally on the mainspring-arbor, and their striking devices, of a moderating-gear driven from the mainspring-arbor, and a stop-lever engaging said moderating-gear and being operated by the minute-snail-device-carrying disk so as to release the moderating-gear when the striking-racks are set for repetition, substantially as set forth.

15. In a repeating watch, the combination of the minute-striking rack provided with teeth at a portion of its circumference, a minute-snail-device-carrying disk provided with teeth intermeshing with the teeth of the minute-striking rack, a projection or heel on the circumference of said disk, a fulcrumed stop-lever engaged by said heel, and a moderating-gear the escapement-wheel of which is provided with a stop-pin that is engaged by said stop-lever when the repeating action is completed, and released from the same when the repeating mechanism is set for action, substantially as set forth.

16. In a repeating watch, the combination, with the hour, quarter-hour and minute striking racks located frictionally on the mainspring-arbor and provided with striking-teeth, of lugs on the circumference of the hour and quarter-hour racks respectively, a stop-pin for arresting said lugs, spring-actuated pawls engaging ratchet-teeth at the circumference of the quarter-hour and minute striking racks, and releasing-levers engaging respectively said pawls as they are successively acted on by the lugs on the hour and quarter-hour striking-racks so as to produce the successive actuation of the quarter-hour and minute striking mechanisms after the hour-striking mechanism, substantially as set forth.

In testimony that I claim the foregoing as my invention I have signed my name in presence of two subscribing witnesses.

FREDRICK W. WASCHAU.

Witnesses:
PAUL GOEPEL,
GEO. W. JAEKEL.